United States Patent
Morris

(10) Patent No.: US 9,440,178 B2
(45) Date of Patent: Sep. 13, 2016

(54) PLEATED FILTER MEDIA

(71) Applicant: Caterpillar Inc., Peoria, IL (US)

(72) Inventor: Bryant Morris, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 201 days.

(21) Appl. No.: 14/311,826

(22) Filed: Jun. 23, 2014

(65) Prior Publication Data

US 2015/0367272 A1    Dec. 24, 2015

(51) Int. Cl.
  *B01D 46/52*  (2006.01)
  *B01D 29/21*  (2006.01)

(52) U.S. Cl.
  CPC ............ *B01D 46/522* (2013.01); *B01D 29/21* (2013.01); *B01D 46/521* (2013.01); *B01D 2201/02* (2013.01); *B01D 2201/125* (2013.01); *B01D 2275/201* (2013.01); *B01D 2275/206* (2013.01)

(58) Field of Classification Search
  CPC .. B01D 46/522; B01D 29/21; B01D 46/521; B01D 2201/125; B01D 2275/201; B01D 2275/206; B01D 2201/02
  See application file for complete search history.

(56) References Cited

U.S. PATENT DOCUMENTS

| | | | | |
|---|---|---|---|---|
| 2,643,735 A * | 6/1953 | Logsdon | ............. | B01D 46/002 55/488 |
| 3,174,688 A | 3/1965 | Chatten | | |
| 3,640,396 A | 2/1972 | Brownell | | |
| 4,151,095 A | 4/1979 | Wright | | |
| 4,544,389 A * | 10/1985 | Howeth | ............. | B01D 46/0043 55/293 |
| 4,617,120 A * | 10/1986 | Barzuza | ................. | B01D 29/05 210/409 |
| 4,643,814 A * | 2/1987 | Goldstein | ............. | B01D 53/02 204/551 |
| 4,720,292 A * | 1/1988 | Engel | ................. | B01D 46/2414 55/337 |
| 5,082,476 A * | 1/1992 | Kahlbaugh | ............ | B01D 39/14 55/320 |
| 5,238,474 A * | 8/1993 | Kahlbaugh | ............ | B01D 39/14 55/320 |
| 5,522,909 A * | 6/1996 | Haggard | ............ | B01D 46/0043 55/327 |
| 6,416,561 B1 * | 7/2002 | Kallsen | ................. | B01D 29/21 55/385.3 |
| 2006/0150594 A1 * | 7/2006 | Ziebold | ............. | B01D 39/2017 55/486 |
| 2009/0188389 A1 | 7/2009 | Dacosta et al. | | |
| 2012/0124961 A1 * | 5/2012 | Jarrier | ................. | B01D 46/002 60/39.092 |
| 2013/0081996 A1 * | 4/2013 | Kamp | .................... | B01D 29/58 210/489 |
| 2013/0193083 A1 * | 8/2013 | Kamp | .................... | B01D 35/30 210/767 |
| 2013/0228499 A1 | 9/2013 | Robinson | | |

FOREIGN PATENT DOCUMENTS

| | | |
|---|---|---|
| EP | 1086736 B1 | 3/2003 |
| GB | 2070970 | 9/1981 |
| JP | 63-242314 A1 | 10/1988 |
| JP | 2003-190718 A1 | 7/2003 |

* cited by examiner

*Primary Examiner* — Amber R Orlando
*Assistant Examiner* — Britanny Precht
(74) *Attorney, Agent, or Firm* — Baker & Hostetler LLP

(57) ABSTRACT

A filter element includes a center tube and a blank of a filter media. The center tube has a first end and a second end. The blank is folded into a plurality of triangles. Each triangle is disposed adjacent to another of the plurality of triangles to form a series of triangular pleats to form a pleated filter media. The pleated filter media is disposed about the center tube. A cross sectional area of the pleated filter media proximal to each of the first end and the second end is greater than a cross sectional area of the pleated filter media at a point between the first end and the second end.

17 Claims, 4 Drawing Sheets

PLEATED FILTER MEDIA

TECHNICAL FIELD

This patent disclosure relates generally to a filter media and, more particularly, to a pleating schema and method for producing a shaped filter media.

BACKGROUND

Filter elements are known to filter particles or other contaminants from fluid such as air, fuel, coolant, and the like. In general, a large surface area of filter media in the filter element facilitates efficient filtering of the fluid. To provide this large surface area, the filter media is typically pleated. In addition, conventional filter housings are often relatively large. To accommodate such filter housings, the filter housings are often located outside the engine compartment of conventional earth moving equipment.

However, having the filter housing located outside the engine compartment is problematic for a variety of reasons such as, for example, the filter housing must be made more robust, the filter housing may be exposed to a dirtier environment, mounting brackets and conduits between the filter housing and components within the engine compartment are more expensive to manufacture and maintain, and the like. Unfortunately, placing filter housings within the engine compartment may call for non-standard shapes.

In addition, conventional pleated filter media may not adequately filter the wide variety of particulate matter typically found in some work environments. That is, because the pleats are identically formed, they do not vary in size and shape. As such, conventional pleated filters may become clogged when tasked with filtering particles outside the intended range of particle sizes.

Accordingly, there is a need for an improved filter to address the problems described above and/or problems posed by other conventional approaches.

SUMMARY

The foregoing needs are met, to a great extent, by aspects of the present disclosure, wherein in one respect a filter is provided that in some aspects addresses the problems posed by other conventional approaches.

An aspect relates to a filter element. The filter element includes a center tube and a blank of a filter media. The center tube has a first end and a second end. The blank is folded into a plurality of triangles. Each triangle is disposed adjacent to another of the plurality of triangles to form a series of triangular pleats to form a pleated filter media. The pleated filter media is disposed about the center tube. A cross sectional area of the pleated filter media proximal to each of the first end and the second end is greater than a cross sectional area of the pleated filter media at a point between the first end and the second end.

Another aspect pertains to a filter cartridge. The filter cartridge includes a filter element, a top cap and a bottom cap. The filter element includes a center tube and a blank of a filter media. The center tube has a first end and a second end. The blank is folded into a plurality of triangles. Each triangle is disposed adjacent to another of the plurality of triangles to form a series of triangular pleats to form a pleated filter media. The pleated filter media is disposed about the center tube. A cross sectional area of the pleated filter media proximal to each of the first end and the second end is greater than a cross sectional area of the pleated filter media at a point between the first end and the second end. The top cap is disposed at a first end of the filter element. The bottom cap is disposed at a second end of the filter element.

Yet another aspect relates to a filter housing. The filter housing includes an inlet, an outlet, an internal volume to house a filter element, a top cap, a bottom cap, and toroidal chamber. The filter cartridge includes a filter element, a top cap and a bottom cap. The filter element includes a center tube and a blank of a filter media. The center tube has a first end and a second end. The blank is folded into a plurality of triangles. Each triangle is disposed adjacent to another of the plurality of triangles to form a series of triangular pleats to form a pleated filter media. The pleated filter media is disposed about the center tube. A cross sectional area of the pleated filter media proximal to each of the first end and the second end is greater than a cross sectional area of the pleated filter media at a point between the first end and the second end. The top cap is disposed at a first end of the filter element. The bottom cap is disposed at a second end of the filter element. The toroidal chamber is disposed about a center portion of the filter element configured to evenly disperse a flow of incoming fluid about the filter element.

There has thus been outlined, rather broadly, certain aspects of the disclosure in order that the detailed description thereof herein may be better understood, and in order that the present contribution to the art may be better appreciated. There are, of course, additional aspects that will be described below and which will form the subject matter of the claims appended hereto.

In this respect, before explaining at least one example in detail, it is to be understood that the disclosure is not limited in its application to the details of construction and to the arrangements of the components set forth in the following description or illustrated in the drawings. The disclosed device and method is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the claims be regarded as including such equivalent constructions insofar as they do not depart from the spirit and scope of the various aspects.

DETAILED DESCRIPTION

Figure 1:
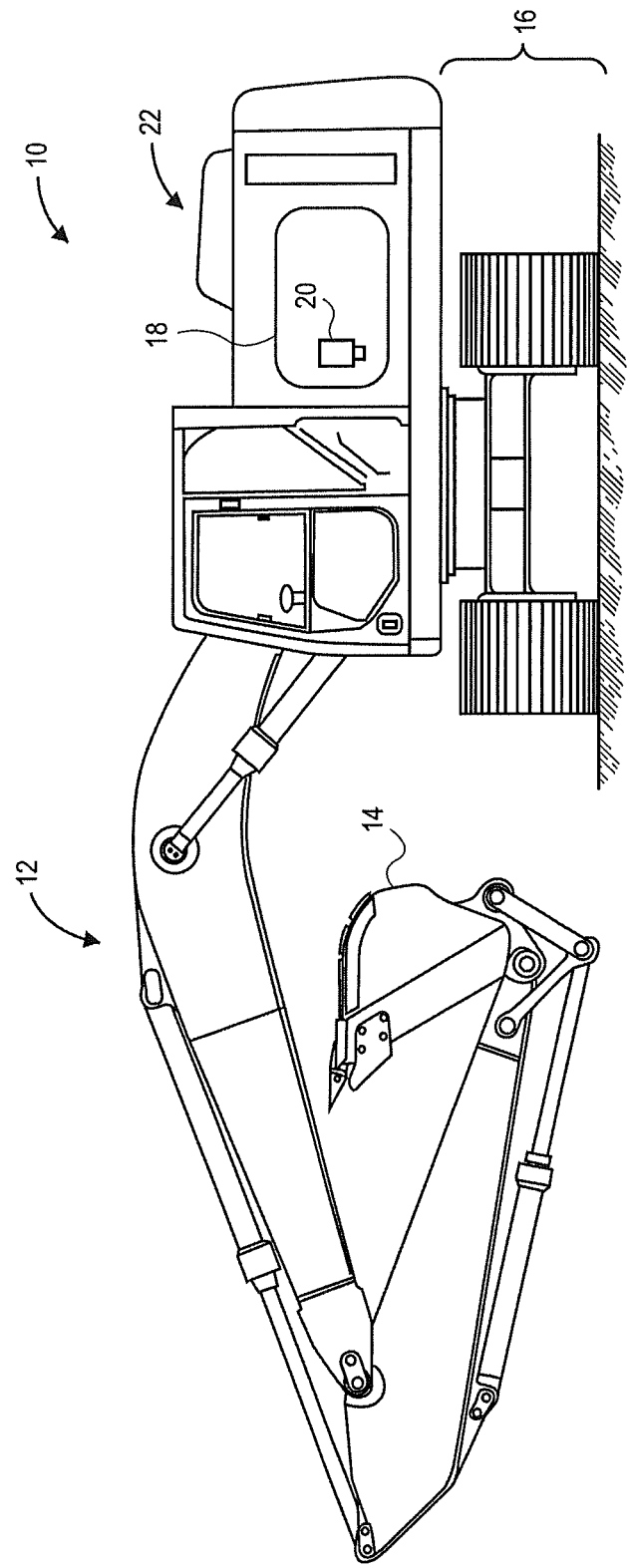
FIG. 1 is a perspective view illustrating an exemplary machine, according to an aspect of the disclosure.

FIG. 1 illustrates an exemplary machine 10 having various systems and components that cooperate to accomplish a task. The machine 10 may embody a fixed or mobile machine that performs some type of operation associated with an industry such as mining, construction, farming, transportation, power generation, or another industry known in the art. For example, the machine 10 may be an earth moving machine such as an excavator (shown in FIG. 1), a dozer, a loader, a backhoe, a motor grader, a dump truck, or another earth moving machine. The machine 10 may include an implement system 12 configured to move a work tool 14, a drive system 16 for propelling the machine 10, a power source 18.

In a particular example, the power source 18 includes an engine configured to combust a fuel such as diesel in the presence of air. This air may be filtered through a filter cartridge assembly 20. As air passes through the filter cartridge assembly 20, contaminants such as dirt, debris, and the like are filtered out and collect in the filter cartridge assembly 20. Periodically, the filter cartridge assembly 20 is inspected to determine if a filter medium (described further herein) disposed within the filter cartridge assembly 20 should be replaced. For example, if sufficient debris has collected on the filter medium, the filter medium may be replaced.

In order to fit the filter cartridge assembly 20 into an engine compartment 22 of the machine 10, it may be advantageous for the filter cartridge assembly 20 to have a non-standard shape and/or size. Additionally, it may be advantageous to have non-standard fluid inlets and/or outlets placement on the filter cartridge assembly 20. As described herein, it is an advantage of embodiments of the filter cartridge assembly 20 that the filter cartridge assembly 20 is a non-standard shape that may be easier to place in the engine compartment 22 as compared to conventional filter cartridges. It is another advantage of embodiments of the filter cartridge assembly 20 that the folding pattern of the filter media may provide greater efficiency and/or greater life filter cartridge life as compared to conventional folding patterns for filter media. Of note, while particular example is made throughout of filtering air, the various embodiments are not limited to filtering air, but rather, include any suitable filtering application. Examples of suitable filtering applications include fuel, hydraulic, lubricant, or other such filtration systems.

Figure 2:
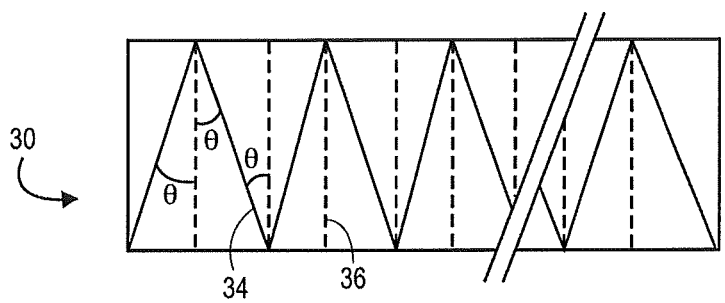
FIG. 2 is a plan view of a blank of a filter media according to an aspect of the disclosure.

FIG. 2 is a plan view of a blank 30 of a filter stock or a filter media 32 according to an aspect of the disclosure. As shown in FIG. 2, the solid lines 34 represent folds that will come up out of the plane of the flat filter stock 32 and the dashed lines 36 represent folds that will go down below the plane. This folding pattern includes a series of adjacent triangles 38 configured to form a series of adjacent triangular pleats 40 (also shown in FIG. 4). Each of the triangles 38 includes an angle θ. Without being bound to any particular value of θ, the larger θ is, the more pronounced the resulting shape of the filter cartridge (shown in FIG. 4). As such, by modifying θ, the final shape of the filter cartridge (shown in FIG. 4) may be controlled.

The filter media 32 may include any suitable material for filtering fluids such as air, fuel, and/or oil. Examples of suitable materials include: paper or other natural material; spun, felted, or woven natural or man-made fibers; polymer foams; and the like. In a particular example, the filter media 32 includes a card stock of felted polyester fibers. This card stock can be cut, scored, folded and able to retain folds. In particular, the card stock of the filter media 32 is able to retain pleats folded therein and may be wrapped around a center tube.

Figure 3:
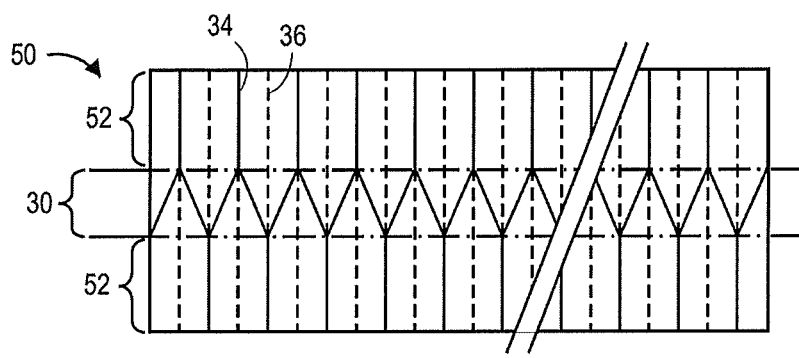
FIG. 3 is a plan view of the blank of the filter media according to another aspect of the disclosure.

FIG. 3 is a plan view of a blank 50 of the filter media 32 according to another aspect of the disclosure. As shown in FIG. 3, the blank 50 includes the blank 30 sandwiched between a pair of extended portions 52. The pair of extended portions 52 act to extend the flare of the conical shape generated by folding the blank 30. This attribute of the extended portions 52 is most clearly seen in FIGS. 5 and 7.

In some examples, the extended portions 52 are regularly pleated portions that continue the pleats generated by the triangular pleats 40. However, while the extended portions may be regularly pleated as shown in FIG. 3, in other examples, the extended portions 52 may include additional triangular pleats 40.

Figure 4:
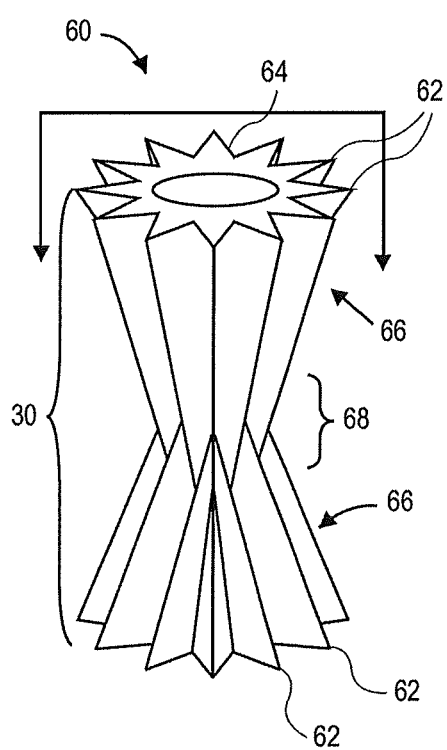
FIG. 4 is a perspective view of a filter folded from the blank of the filter media according to FIG. 2.

FIG. 4 is a perspective view of a filter 60 folded from the blank 30 of the filter media 32 according to FIG. 2. As shown in FIG. 4, the blank 30 shown in FIG. 2 has been folded to generate a series of pleats 62. The pleated blank 30 is shown wound about a center tube 64 to generate the filter 60. More particularly, the filter 60 with the pleated blank 30 wrapped thereabout includes a first end and second end. A cross sectional area of the filter media 32 proximal to each of the first end and the second end is greater than a cross sectional area of the filter media 32 at a point between the first end and the second end. In general, the shape of the filter 60 may be defined by a pair of truncated cones joined at their respective smaller ends. In various examples, the truncated cones may be the same or different sizes and/or shapes. In this regard, the filter 60 includes a pair of flared portions 66. The degree to which the pair of flared portions 66 flair out is dependent upon the angle θ of the triangles 38 as shown in FIG. 2. The pair of flared portions 66 intersects at an angle of slightly less than 2×θ (As shown in FIG. 2). As such, by modifying θ, the amount of flair in the shape of the filter 60 may be modulated.

Figure 6:
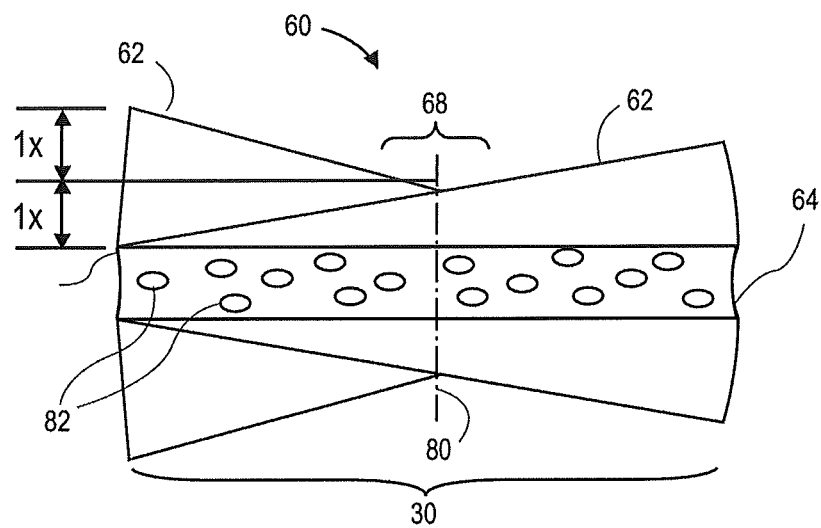
FIG. 6 is a cross sectional view of the filter folded from the blank of filter media according to FIG. 2.

As shown in FIG. 4, the pleats 62 from one of the flared portions 66 interleave with the pleats 62 of the other. At a central portion 68, all of the pleats 62 are close to the same height. However, at the ends of the filter 60, every other pleat 62 essentially terminates. Also at the ends of the filter 60, the remaining pleats 62 extend radially outwardly from the center tube 64 about twice as far as the pleats 62 at the central portion 68 extend radially outwardly from the center tube 64. This geometry is also shown in FIG. 6. Of note, the filter 60 includes regions of the pleats 62 that are more closely spaced near the central portion 68 and regions of the pleats 62 that are less closely spaced at the ends of the filter 60. The closer spaced pleats 62 disposed at the central portion 68 may facilitate the filtration of relatively finer particulates in comparison to larger particulates that may be accommodated by the larger spacing of the pleats 62 at the ends of the filter 60. As such, it is an advantage of this geometry that a wide variety of particulates may be filtered by the filter 60.

Figure 5:
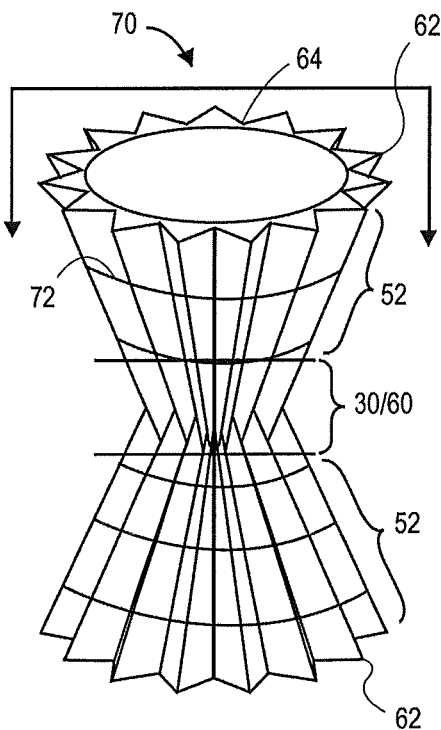
FIG. 5 is a perspective view of the filter folded from the blank of the filter media according to FIG. 3.
Figure 7:
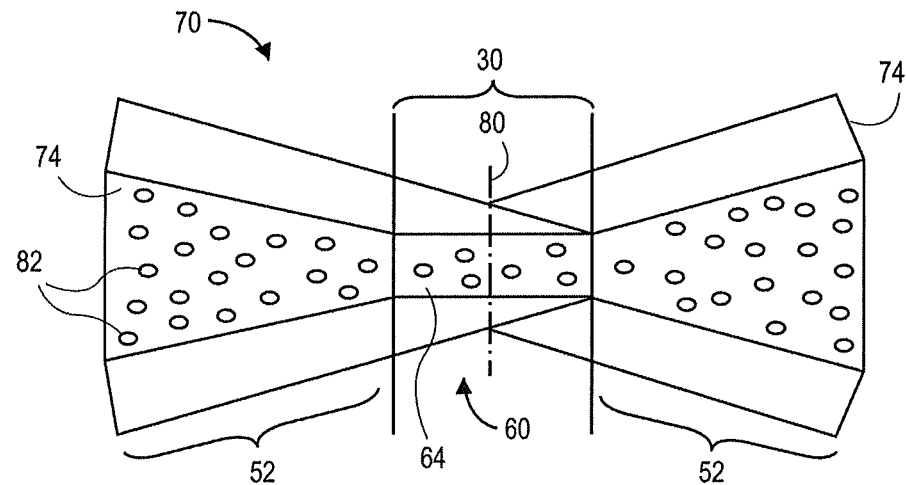
FIG. 7 is a cross sectional view of the filter folded from the blank of filter media according to FIG. 3.

FIG. 5 is a perspective view of a filter 70 folded from the blank 50 of the filter media 32 according to FIG. 3. As shown in FIG. 5, the filter 70 includes the filter 60 sandwiched between the pair of extended portions 52. The pair of extended portions 52 act to extend the flare of the shape generated by folding the blank 30 to form the filter 60. This attribute of the extended portions 52 is also seen in FIG. 7. It is an advantage of the filter 70 that the pair of extended portions 52 increase the amount of less closely spaced pleats 62 relative to the filter 60 and thereby increase the ability of the filter 70 to accommodate a higher load of larger particulate matter.

Also shown in FIG. 5, the filter 70 optionally includes a roving 72. If included, the roving 72 may be affixed to the pleats 62 to retain the pleats 62 at a particular spacing and/or to help retain the overall shape of the filter 70. In the particular example shown in FIG. 5, the roving 72 is spiral wound about the filter 70. However, in other optional examples, the roving 72 may be concentrically affixed, crisscrossed, may be a mesh, or the like.

FIG. 6 is a cross sectional view of the filter 60 folded from the blank 30 of the filter media 32 according to FIG. 2. As shown in FIG. 6, the triangularly shaped pleats 62 intersect at a minimum cross-section 80 of the filter 60. If the height of the pleats 62 is given a value of x at the minimum cross-section 80, then half of the pleats 62 have a height of 2x at one end of the filter 60 and the other half of the pleats 62 have a height of 0 at the same end of the filter 60.

Also shown in FIG. 6, the center tube 64 is a cylinder with slits or perforations 82 disposed throughout to allow the flow of fluid therethrough. It is an advantage of the filter 60 that the center tube 64 is a cylinder and therefore easy and inexpensive to manufacture. It is a particular advantage that the center tube 64 is a cylinder while the outer geometry of the filter 60 is in the shape of a pair of truncated cones joined at the respective small ends thereof. The shape of the filter 60 may also be described as two truncated cones joined at the minimum cross-section 80. Accordingly, if the filter 60 is cut at the minimum cross-section 80, a pair of truncated cone-shaped filters is formed. An example of such a truncated cone-shaped filter is shown in FIG. 8.

FIG. 7 is a cross sectional view of the filter 70 folded from the blank 50 of the filter media 32 according to FIG. 3. As shown in FIG. 7, the filter 70 includes the filter 60 sandwiched between the pair of extended portions 52. The pair of extended portions 52 act to extend the flare of the shape generated by folding the blank 30 to form the filter 60. That is, the triangular pleats 40 are created at the angle θ and the extended portions 52 continue that angle. Stated another way, the angle defined by the filter 60 from the minimum cross-section 80 to the ends of the filter 60 is continued by the respective extended portion 52. It is an advantage of the filter 70 that the pair of extended portions 52 increase the amount of less closely spaced pleats 62 relative to the filter 60 and thereby increase the ability of the filter 70 to accommodate a higher load of larger particulate matter.

Also shown in FIG. 7, the pair of extended portions 52 increases the amount of internal free space within the filter 70. More particularly, the extended portions 52 generate conical or truncated cone-shaped interior volumes that abut the cylindrical portion disposed between the two extended portions 52. These extended portions 52 are supported by a conical center tube 74 portion that includes a corresponding truncated cone shape. The volume within the conical center tube 74 provides the increased internal free space within the filter 70. This increased free space may facilitate greater flow rates in some filtering applications. In addition or alternatively, the internal free space may be utilized to include an addition filter element and/or other component within the filter 70.

Figure 8:
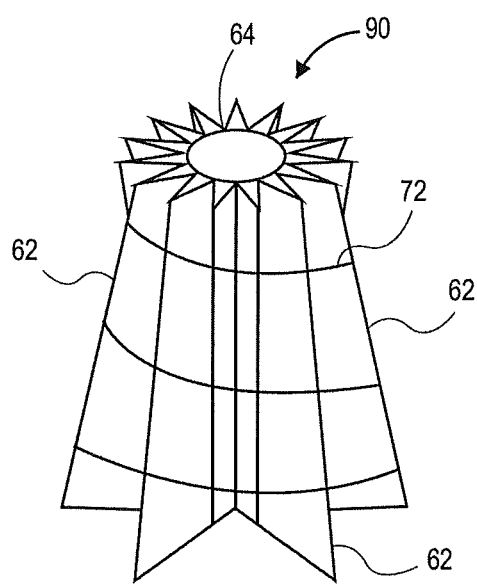
FIG. 8 is a perspective view of another filter folded from the blank of filter media according to FIG. 2.

FIG. 8 is a perspective view of another filter 90 folded from the blank 30 of the filter media 32 according to FIG. 2. As shown in FIG. 8, the filter 90 is a truncated cone shape. The filter 90 may be generated from cutting the filter 60 in half at the minimum cross-section 80

Figure 9:
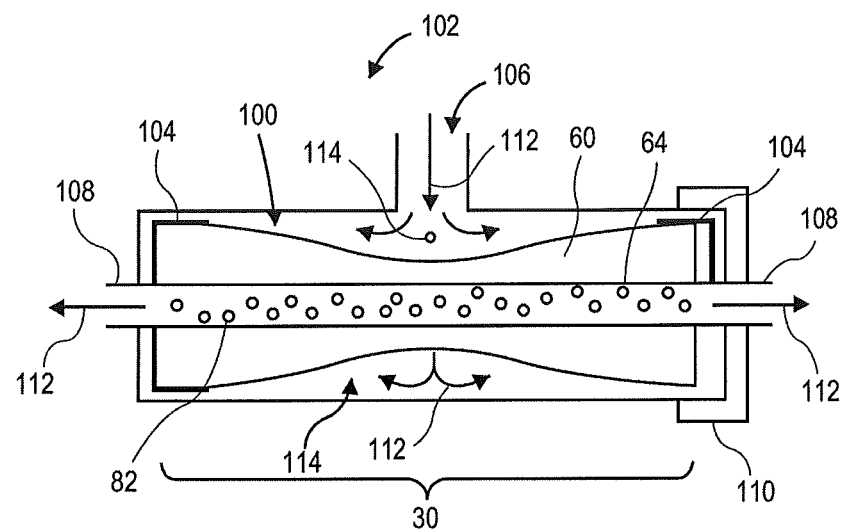
FIG. 9 is a cross sectional view of a filter cartridge disposed in a filter housing.

FIG. 9 is a cross sectional view of a filter cartridge 100 disposed in a filter housing 102. As shown in FIG. 9, the filter cartridge 100 includes the filter 60, the center tube 64, and a pair of end caps 104. Depending upon the orientation of the filter cartridge 100, the end caps 104 may be referred to as a top cap and a bottom cap. The end caps 104 provide a seal to the ends of the filter 60 so that fluid is prevented from flowing unfiltered into the ends of the filter 60. Of note, although the filter cartridge 100 is shown including the filter 60, in other examples, the filter 70 may be included within the filter cartridge 100.

The filter housing 102 includes an inlet 106, one or a pair of outlets 108, and a lid 110. The inlet 106 provides an access for a fluid to enter the filter housing 102. The inlet 106 may further provide a fitting for a conduit (not shown) to convey the fluid to the filter housing 102. The inlet 106 may be disposed at or near a midpoint along a long axis of the filter 60.

The one of more outlets are disposed in cooperative alignment with the long axis of the filter 60 and/or the center tube 64. The outlets 108 are fluidly connected to the center tube 64 and provide a conduit for the flow of the filter fluid from the center tube 64. In addition, the outlets 108 may provide a fitting for a conduit (not shown) to convey the filtered fluid from the filter housing 102. As shown by a plurality of flow lines 112 indicating the direction of flow of the fluid through the filter housing 102, fluid flowing into the filter housing 102 is introduced to an entry chamber 114. This entry chamber 114 is generally shaped as a toroid that has the greatest volume near the inlet 106 and tapers towards the ends of the filter housing 102. It is an advantage that this shape greatly enhances filtration by providing an even distribution of the fluid about the filter cartridge 100.

After passing through the filter 60, the fluid enters the center tube 64. Thereafter, the fluid may flow through one or both outlets 108. Of note, while two outlets 108 are shown in FIG. 9, in this or other examples, the filter housing 102 may include a single outlet 108 only.

Figure 10:
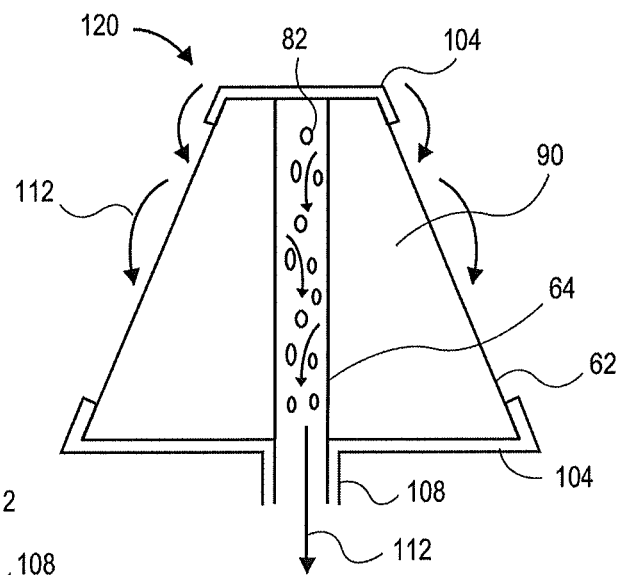
FIG. 10 is a cross sectional view of another filter cartridge having the filter according to FIG. 8 showing flow through the filter.

FIG. 10 is a cross sectional view of another filter cartridge 120 having the filter 90 according to FIG. 8 showing flow of the fluid through the filter 90. As shown in FIG. 10, the filter cartridge 120 includes the pair of end caps 104 disposed on the filter 90. The end cap 104 disposed at the top of the filter 90 is configured to prevent unfiltered fluid from entering the center tube 64. The end cap 104 disposed at a bottom portion of the filter 90 includes the outlet 108 to convey fluid from the center tube 64. In addition, the end cap disposed at the bottom portion of the filter 90 is configured to prevent unfiltered fluid from entering the center tube 64 via the pleats 62 (shown more clearly in FIG. 8). An advantage of the filter 90 is that, while the outside dimensions are a truncated cone, the center tube 64 is a cylinder. In general, a cylindrical center tube is less expensive to produce, easier to work with, and reduces an internal volume within the center tube 64.

Figure 11:
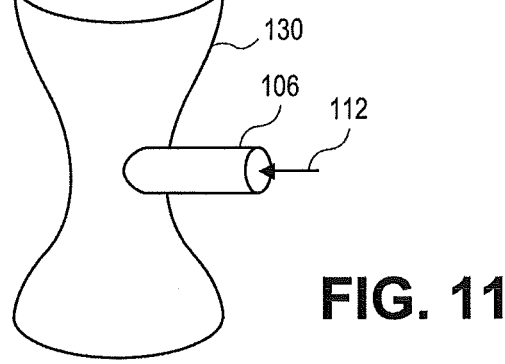
FIG. 11 is a perspective view of a filter housing assembly according to an aspect of the disclosure.

FIG. 11 is a perspective view of a filter housing 130 assembly according to an aspect of the disclosure. As shown in FIG. 11, the filter housing 130 includes the inlet 106 and outlet 108. The inlet 106 may be disposed off-center in order to generate a vortex or circular flow within the filter housing 130 and/or in order to better fit within an engine compartment of the machine 10. In addition, the filter housing 130 may include a shape to generally follow the shape of the filter 60 or 70. Alternatively, the filter housing 130 may be cylindrically shaped.

INDUSTRIAL APPLICABILITY

The present disclosure may be applicable to any machine including a fluid to be filtered. Aspects of the disclosed filter may promote ease of manufacture, operational flexibility, filtration performance, and improved lifespan of a filter cartridge.

Applicant discovered that by modifying a folding pattern of a filter media, filter having an exterior shape generally defined by a pair of truncated cones attached at the respective smaller ends of the cones may be generated that includes a cylindrical interior. This shaped filter may be cut in two to generate a pair of truncated cone-shaped filters. Again, these truncated cone-shaped filters include a cylindrical interior. In both cases, the cylindrical interior is suitable to receive a cylindrical center tube that is inexpensive and easy to manufacture. Applicant noted the shape conveyed advantages to a filtration system in that fluid entering the filter housing was better dispersed over the filter. In addition, the changing height of the pleats created by this novel folding pattern improved some aspects of filtration performance. Applicant noted conventionally pleated filter media was unsuitable for forming this novel shape.

According to an aspect of the disclosure shown in FIG. 9, the improved filter housing 102 is an elegant and uncomplicated solution to increase filtration performance by generating a toroidal chamber that facilitates an even distribution of the fluid over the filter 60. This improvement is made while retaining an inexpensive and easy to manufacture cylindrical center tube 64. Thus, instead of incurring greater complexity and/or operating costs to achieve this filtration improvement, the filter cartridge 100 is inexpensive to manufacture.

According to an aspect of the disclosure, with reference to FIG. 10, the filter cartridge 120 may be generated by cutting the filter 60 in half. As in the filter 60, the center tube 64 of the filter cartridge 120 includes a cylindrical shape that is easy and inexpensive to manufacture while the exterior shape of the filter 90 includes a truncated cone that improves certain aspects of filtration efficiency.

A benefit of the filters 60, 70 and 90 is that a relatively wider variety of particulate matter may be efficiently filtered from the fluid in comparison to conventional pleated filters. This benefit is conveyed by varying the height and spacing of the pleats 62. By doing so, the filters 60, 70, and 90 include spacing suited to the wide variety of particulate matter often encountered at job sights that include earth moving, construction, demolition, and the like. For at least these reasons, the filters 60, 70 and 90 greatly improve the filtration capability of the machine 10. It will be appreciated that the ability to efficiently filter a wider variety of particulate matter without raising the cost or complexity of manufacture provides a great improvement over conventional filtration systems.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified. The many features and advantages of the various aspects are apparent from the detailed specification, and thus, it is intended by the appended claims to cover all such features and advantages that fall within the true spirit and scope of the aspects. Further, since numerous modifications and variations will readily occur to those skilled in the art, it is not desired to limit the aspects to the exact construction and operation illustrated and described, and accordingly, all suitable modifications and equivalents may be resorted to, falling within the scope of the various aspects.

I claim:

1. A filter element, comprising:
   a center tube having a first end and a second end;
   a blank of a filter media folded into a plurality of triangles, wherein each triangle is disposed adjacent to another of the plurality of triangles to form a series of triangular pleats to form a pleated filter media, the pleated filter media being disposed about the center tube, wherein a cross sectional area of the pleated filter media proximal to each of the first end and the second end is greater than a cross sectional area of the pleated filter media at a point between the first end and the second end; and
   the blank of filter media further comprises at least one of a first pleated extended portion to extend the pleated filter media along a first truncated cone shaped surface defined by the pleated filter media from a relatively minimum cross sectional area to the cross sectional area at the first end; and a second pleated extended portion to extend the pleated filter media along a second truncated cone shaped surface defined by the pleated filter media from the relatively minimum cross sectional area to the cross sectional area at the second end.

2. The filter element according to claim 1, further comprising:
   a top cap disposed at the first end; and
   a bottom cap disposed at the second end.

3. The filter element according to claim 1, further comprising:
   a spiral roving disposed about the filter element.

4. The filter element according to claim 1, further comprising:
   a pair of truncated cone-shaped filters generated by cutting the filter element in half.

5. The filter element according to claim 1, further comprising:
   a filter housing to contain the filter element.

6. The filter element according to claim 5, further comprising:
   an inlet disposed in the filter housing, the inlet being at a midpoint along a long axis of the filter.

7. The filter element according to claim 6, further comprising:
an outlet disposed in the filter housing, the outlet being disposed in cooperative alignment with the long axis of the filter.

8. A filter cartridge, comprising:
a filter element including:
a center tube having a first end and a second end; and
a blank of a filter media folded into a plurality of triangles, wherein each triangle is disposed adjacent to another of the plurality of triangles to form a series of triangular pleats to form a pleated filter media, the pleated filter media being disposed about the center tube, wherein a cross sectional area of the pleated filter media proximal to each of the first end and the second end is greater than a cross sectional area of the pleated filter media at a point between the first end and the second end;
the blank of filter media further comprising a first pleated extended portion to extend the pleated filter media along a first truncated cone shaped surface defined by the pleated filter media from a relatively minimum cross sectional area to the cross sectional area at the first end; and a second pleated extended portion to extend the pleated filter media along a second truncated cone shaped surface defined by the pleated filter media from the relatively minimum cross sectional area to the cross sectional area at the second end;
a top cap disposed at the first end; and
a bottom cap disposed at the second end.

9. The filter cartridge according to claim 8, further comprising:
a spiral roving disposed about the filter element.

10. The filter cartridge according to claim 8, further comprising:
a pair of truncated cone-shaped filters generated by cutting the filter element in half.

11. The filter cartridge according to claim 8, further comprising:
a filter housing to contain the filter element.

12. The filter cartridge according to claim 11, further comprising:
an inlet disposed in the filter housing, the inlet being at a midpoint along a long axis of the filter.

13. The filter cartridge according to claim 12, further comprising:
an outlet disposed in the filter housing, the outlet being disposed in cooperative alignment with the long axis of the filter.

14. A filter housing, comprising:
an inlet;
an outlet;
an internal volume to house a filter element, the filter element including:
a center tube having a first end and a second end; and
a blank of a filter media folded into a plurality of triangles, wherein each triangle is disposed adjacent to another of the plurality of triangles to form a series of triangular pleats to form a pleated filter media, the pleated filter media being disposed about the center tube, wherein a cross sectional area of the pleated filter media proximal to each of the first end and the second end is greater than a cross sectional area of the pleated filter media at a point between the first end and the second end;
the blank of filter media further comprising a first pleated extended portion to extend the pleated filter media along a first truncated cone shaped surface defined by the pleated filter media from a relatively minimum cross sectional area to the cross sectional area at the first end; and a second pleated extended portion to extend the pleated filter media along a second truncated cone shaped surface defined by the pleated filter media from the relatively minimum cross sectional area to the cross sectional area at the second end;
a top cap disposed at the first end;
a bottom cap disposed at the second end; and
a toroidal chamber disposed about a center portion of the filter element configured to evenly disperse a flow of incoming fluid about the filter element.

15. The filter housing according to claim 14, further comprising:
a spiral roving disposed about the filter element.

16. The filter housing according to claim 14, wherein the inlet is disposed at a midpoint along a long axis of the filter.

17. The filter cartridge according to claim 16, wherein the outlet is disposed in cooperative alignment with the long axis of the filter.

* * * * *